UNITED STATES PATENT OFFICE.

KURT DESAMARI, OF COLOGNE, GERMANY, ASSIGNOR TO SYNTHETIC PATENTS CO., INC., OF NEW YORK, N. Y., A CORPORATION OF NEW YORK.

AZO DYE.

1,125,074.  Specification of Letters Patent.  Patented Jan. 19, 1915.

No Drawing.  Application filed April 1, 1914.  Serial No. 828,781.

*To all whom it may concern:*

Be it known that I, KURT DESAMARI, doctor of technical arts, chemist, citizen of the German Empire, residing at Cologne-on-the-Rhine, Germany, have invented new and useful Improvements in Azo Dyes, of which the following is a specification.

I have found that by coupling the diazo compound prepared from para-aminophenylthiazolesulfocarboxylic acid having most probably the formula:

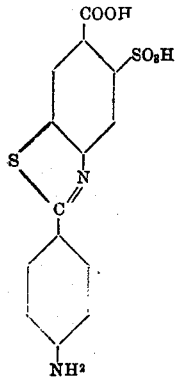

(obtainable by oxidation of acetyldehydrothiotoluidin sulfonic acid with permanganate and by elimination of the acetyl residue from the product of oxidation) with an aceto-acetic-arylamid having most probably the formula:

$$CH_3—CO—CH_2—CO—NH—R$$

(R=an aryl e. g. —$C_6H_7$, —$C_6H_4$—$CH_3$, —$C_6H_4$—$OCH_3$, —$C_6H_4$—COOH), coloring matters having most probably in a free state the formula:

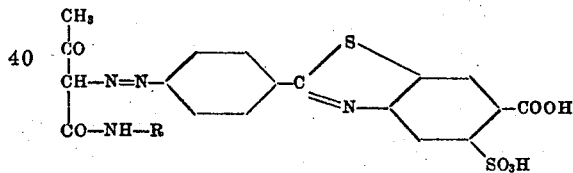

easily soluble in water are obtained which dye cotton in greenish-yellow shades of great purity.

The new products are after being dried and pulverized yellowish powders. Their sodium salts are easily soluble in water with a yellowish coloration. They yield upon reduction with stannous chlorid and hydrochloric acid the para-aminophenylthiazolesulfocarboxylic acid.

In order to illustrate the new process more fully the following examples are given, the parts being by weight:

Example 1: 350 parts of the carboxylic acid, obtained by the oxidation of acetyldehydrothiotoluidin sulfonic acid and by subsequent saponification of the product of oxidation are diazotized with 69 parts of sodium nitrite and 30 parts of concentrated HCl. A solution of 177 parts of acetoacetic-anilid

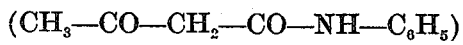

in 120 parts of caustic soda lye (33 per cent.) is added to the resulting diazo solution to which an excess of sodium bicarbonate has been added and which has to be kept at a temperature of from 0–5° C. The combination is soon finished. The easily soluble dyestuff is isolated by salting it out. It dyes cotton in pure very greenish-yellow shades. It has in a free state most probably the formula:

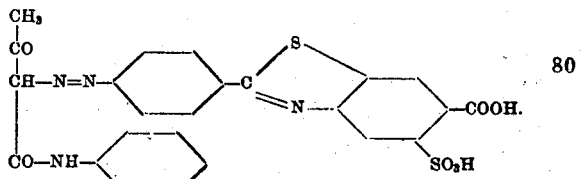

Example 2: 350 para-aminophenylphenthiazolesulfo-carboxylic acid are diazotized and a solution of 207 parts of aceto-acetic-para-anisidid

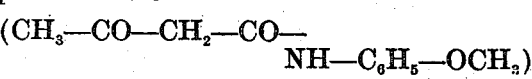

in the calculated quantity of caustic soda lye is added to the diazo solution to which an excess of sodium bicarbonate has been added. The dyestuff thus obtained is isolated by salting it out. It dyes cotton in pure yellow shades.

I claim:—

1. The new dyestuffs derivable from diazotized para-aminophenylphenthiazolesulfocarboxylic acid and aceto-acetic-arylamid having in a free state most probably the formula:

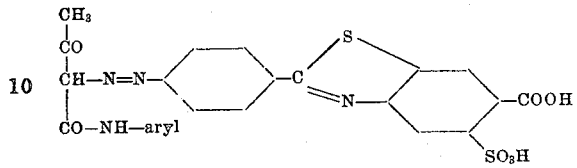

which are in the shape of their sodium salts after being dried and pulverized yellowish powders soluble in water with a yellowish coloration; yielding upon reduction with stannous chlorid and hydrochloric acid para-aminophenylphenthiazolesulfocarboxylic acid; and dyeing cotton yellow shades, substantially as described.

2. The new dyestuff derivable from diazotized para-aminophenylphenthiazolesulfocarboxylic acid and aceto-acetic-anilid having in a free state most probably the formula:

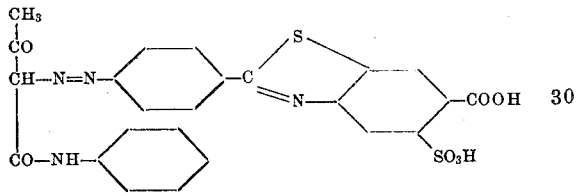

which is in the shape of its sodium salt after being dried and pulverized a yellowish powder soluble in water with a yellowish coloration; yielding upon reduction with stannous chlorid and hydrochloric acid para-aminophenylphenthiazolesulfocarboxylic acid; and dyeing cotton in pure greenish-yellow shades, substantially as described.

In testimony whereof I have hereunto set my hand in the presence of two subscribing witnesses.

KURT DESAMARI.

Witnesses:
LOUIS VANDORY,
HANS BRÜCKNER.

Copies of this patent may be obtained for five cents each, by addressing the "Commissioner of Patents, Washington, D. C."